Nov. 26, 1963

N. EVANS ETAL 3,111,839

METHOD FOR DETECTING SUSPENDED
SOLID MATERIAL IN LIQUIDS

Filed Oct. 14, 1960

INVENTORS:
NORMAN EVANS
KENNETH WICKS
GORDON JOHN SMITH
BY: Morgan, Finnegan, Durham & Pine
ATTORNEYS

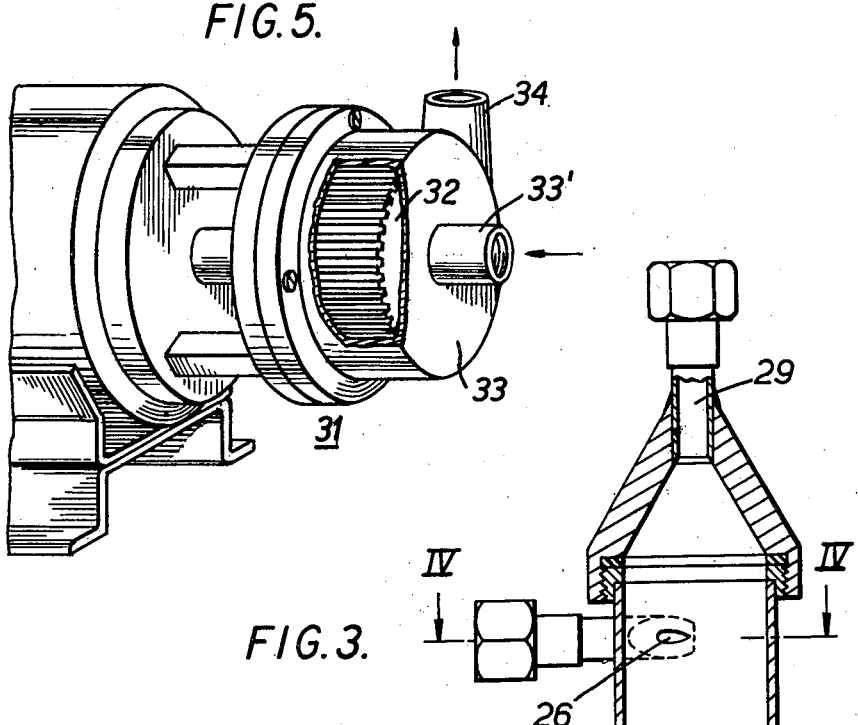
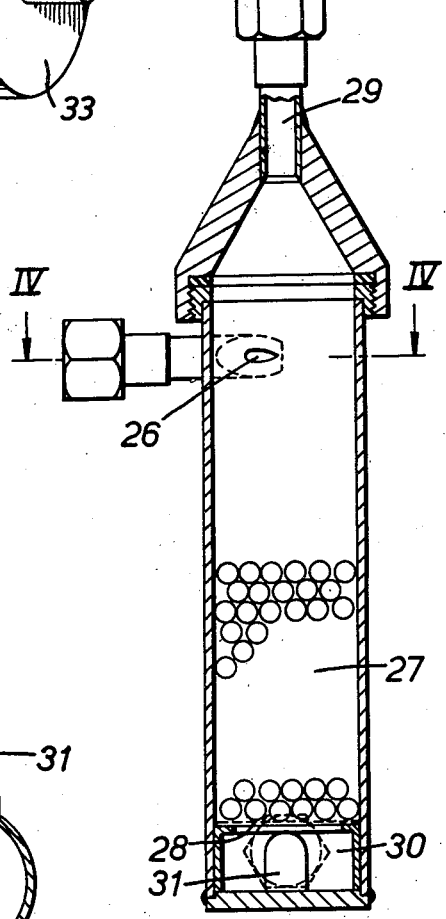
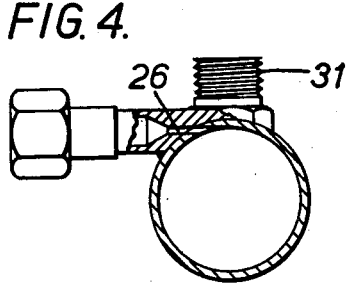

United States Patent Office 3,111,839
Patented Nov. 26, 1963

3,111,839
METHOD FOR DETECTING SUSPENDED SOLID MATERIAL IN LIQUIDS
Norman Evans, Kenneth Wicks, and Gordon John Smith, Sunbury-on-Thames, England, assignors to The British Petroleum Company Limited, London, England, a British company
Filed Oct. 14, 1960, Ser. No. 62,623
Claims priority, application Great Britain Oct. 26, 1959
13 Claims. (Cl. 73—61)

The invention relates to a method of detecting suspended solid material in liquids which also contain minor amounts of a suspended liquid whose solubility increases with increasing temperature. The invention relates particularly to the detection of suspended solid material in liquid hydrocarbons, for example aviation fuels which may also contain minor amounts of suspended water.

The objections to the presence of solid material in aviation fuels are obvious and well known and there is a need for a satisfactory method of continuously testing fuel being loaded to aircraft for the presence of solid material. There are difficulties, however, in detecting small amounts of solid material particularly when suspended water particles are also present.

The present invention uses a light absorption method, and according to the present invention a method for detecting minor amounts of solid material suspended in a liquid which may also have suspended in it a minor amount of another liquid whose solubility increases with increasing temperature comprises heating a sample of the material to be tested to dissolve the suspended liquid in the other liquid, splitting the heated material into two streams, removing solid material from one stream, passing a beam of light through each stream and comparing the light absorption of each stream.

The invention is particularly suitable for detecting the presence of solid material in a hydrocarbon or hydrocarbon mixture, for example an aviation fuel and in particular an aviation kerosine.

The material to be tested is heated to a temperature such that all the suspended liquid is dissolved and remains dissolved until the light absorptions have been compared, the dissolved liquid having no effect on the light absorption. Solid material may be detected in a liquid containing suspended liquid in an amount which is limited by the solubility of the suspended liquid at the temperature at which appreciable vapourisation of the lower boiling liquid commences. In the case of aviation kerosine containing suspended water, solid material may be detected where the water is present in an amount of up to 500 parts of suspended water per million parts of fuel.

The stream from which solid material is removed becomes a reference sample. The solid material is preferably removed by means of a suitable filter.

The material to be tested is preferably treated to remove any vapour and/or air bubbles which could affect the light absorption. This treatment, which may be carried out in any convenient form of air/vapour separator, should be given to the material to be tested before the material enters the light absorption cells and conveniently before the material is split into two streams. It has been found particularly desirable to treat the heated material so that any entrained air or air driven out of solution by heating or any vapour formed during the heating is removed.

If required, the material to be tested may be agitated prior to heating to disperse the suspended liquid and so facilitate solution in the heating stage.

The light absorption can be compared in any convenient way, for example by means of photo-electric cells connected to a suitable electrical bridge circuit.

If the present invention detects the presence of solid material, the material undergoing test can subsequently be treated to remove the suspended solid material by any convenient method, for example filtration.

The present invention includes an apparatus for detecting minor amounts of solid material suspended in a liquid which may also have suspended in it a minor amount of another liquid whose solubility increases with increasing temperature comprising a line for the material to be tested which is split into two branches, means for heating the material to be tested prior to a subsequent light absorption, means for removing solid material from one of the branches, a light absorption cell in each branch with a photo-electric cell attached to each light absorption cell, a source of light and means for comparing the light absorption in each light absorption cell.

Preferably the means for heating the material to be tested is situated in the line before branching. Any convenient type of heater may be used, for example an electrical immersion heater or a jacket type heated by electricity or a suitable liquid. The capacity of the heater may vary depending on the purpose for which the apparatus is used and the throughput of the apparatus, but for the preferred use for detecting solid material in hydrocarbon fuels it should be capable of raising the temperature of the fuel sample to about 80° C.

Any suitable means for removing the solid material from one of the branches may be employed such as a filter, for example a "Millipore" filter.

The apparatus preferably includes at least one air/vapour separator to remove air and vapour bubbles situated before the light absorption cells, preferably situated in the line before branching but after the heater. A convenient form of air/vapour separator is one in which the material is injected tangentially into a chamber to form a vortex, the vortex being subsequently broken by a layer of suitable inert particles, for example glass beads, which also serves to coalesce any air or vapour bubbles present.

The apparatus preferably includes means for cooling the photoelectric cells, for example jackets surrounding the cells through which a cooling fluid may be passed. The cooling fluid may conveniently be a non-heated portion of the material to be tested which is passed to the jackets through a line starting at a point in the sample line prior to the heater. This cooling fluid line may be split into two branches, one branch passing through a jacket surrounding one of the photo-electric cells, the other branch passing through the other jacket surrounding the other photo-electric cell.

The apparatus may include a suitable disperser situated prior to the heater to break down the suspended liquid particles so as to facilitate solution during the heating stage. A suitable form of disperser comprises a disc having a serrated edge rotatable inside a casing, the clearance between the serrated edge and the casing being adjusted to give the required suspended liquid particle size. Such a disperser may, for example, comprise a centrifugal pump, the impeller of which is replaced by a disc having a serrated edge, the clearance between the edge of the disc and the pump casing being adjusted to give the required suspended liquid particle size.

The apparatus may also include suitable valves as required for operating the instrument and may also include a pressure indicator. The rate of flow of the material to be tested through the indicator may conveniently be controlled by operating a suitable valve in conjunction with a pressure gauge situated downstream from the valve.

An electrical bridge circuit may conveniently be used to compare the light absorption in the light absorption cells, and the circuit may include an alarm system. The alarm system may operate an alarm light, a bell or other warning signal and may also be made to operate either a shut-off system or a by-pass system to divert fuel from the aircraft should the presence of solid material be detected.

The invention is illustrated and described in relation to the accompanying FIGURES 1, 2, 3 and 4.

FIG. 3 is a vertical section through a suitable type of air/vapour separator.

FIG. 4 is a plan view of the air/vapour separator.

FIG. 5 is a fragmentary view in perspective of a disperser in the flow diagram of FIG. 1.

Figure 1:
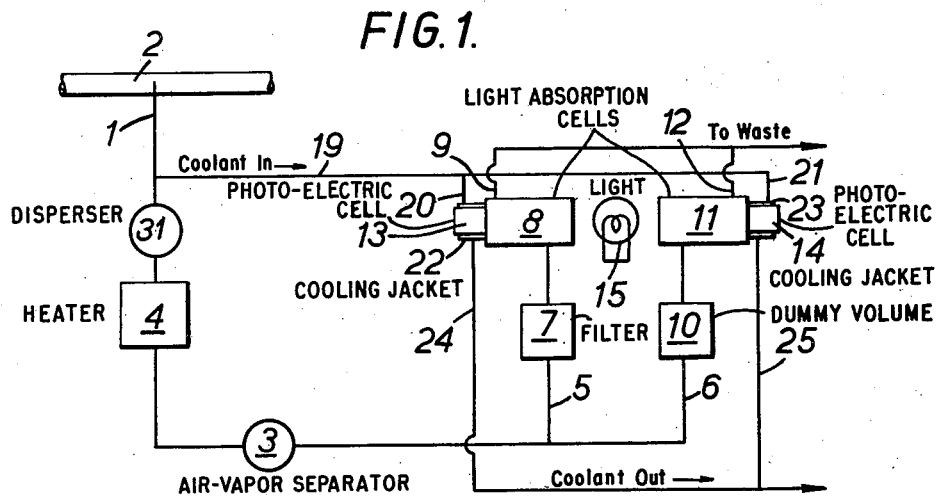
FIG. 1 is a flow diagram indicating the passage of the sample to be tested through the apparatus.
Figure 2:
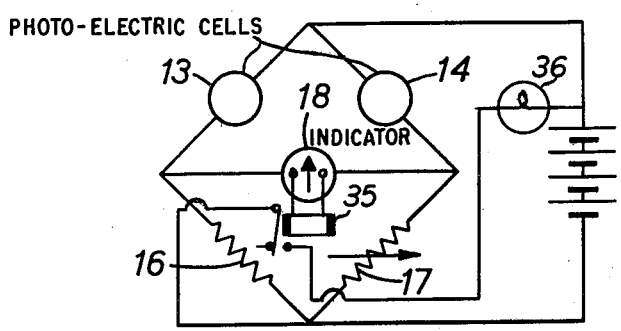
FIG. 2 shows a suitable electrical circuit for comparing the light absorptions, the circuit incorporating an alarm relay system.

In FIG. 1, in an aircraft fuel loading system a sample line 1 leads from the main fuel-to-aircraft line 2 through dispenser 31, heater 4 and air/vapour separator 3. The sample line 1 then splits into two branches 5 and 6. Branch 5 passes through filter 7 to light absorption cell 8 and out to waste via line 9. Branch 6 passes through dummy volume 10 and light absorption cell 11 and out to waste via line 12. Photo-electric cells 13 and 14 are attached to light absorption cells 8 and 11 respectively which have a common light source 15. Line 19 leads from a point in the sample line 1 before heater 4 and splits into branches 20 and 21 which pass respectively through jackets 22 and 23 surrounding respectively photo-electric cells 13 and 14 and thence respectively out to waste via lines 24 and 25. Photo-electric cells 13 and 14 are connected to an electrical bridge circuit of the type illustrated in FIG. 2 where they form two adjacent arms of the circuit, the other two arms being fixed resistor 16 and variable resistor 17. The bridge arm comprises an indicator 18 which incorporates an alarm relay 35 which may be set to operate a signal light 36 should the presence of solid material be detected.

Fuel passing along sample line 1 passes through heater 4 and air/vapour separator 3 and splits along branches 5 and 6. As the solubility of water in aviation fuel increases appreciably with temperature, any free water present is dissolved in heater 4 and a fuel, free of suspended water passes into separator 3 where air and vapour bubbles are removed and thence along branches 5 and 6. Any solid material in the fuel passing along branch 5 is removed by filter 7 and a fuel free of suspended water and solid material passes into light absorption cell 8. The unfiltered fuel passing along branch 6 retains any solid material as it passes into light absorption cell 11. Unheated fuel passes along line 19 and branches 20 and 21 through jackets 22 and 23 surrounding photo-electric cells 13 and 14 respectively and thence out to waste via lines 24 and 25. This controls the temperature of photo-electric cells 13 and 14 and minimises any instability in the output of photo-electric cells 13 and 14 due to the heating effect of material in light absorption cells 8 and 11. Photo-electric cells 13 and 14 are of the resistance changing type, and any solid particles present in absorption cell 11 will disperse the beam of light from source 15 and alter the resistance of photo-electric cell 14. The fuel in cell 8 provides a continuous reference sample, dummy volume 10 ensuring that there is no time lag in the flow of fuel through cell 8 compared with cell 11. Any alteration in the resistance of photo-electric cell 14 due to the presence of solid material will cause a deflection on the bridge arm indicator 18.

As shown in FIGS. 3 and 4 the material being tested is injected into the air/vapour separator via a jet 26 to form a vortex in the upper part of the separator. The vortex is broken by the layer of glass beads 27 which is supported on gauze 28. This layer also coalesces any air and vapour bubbles, the air and vapour being removed via line 29. The material being tested leaves the separator via free space 30 and line 31.

As shown in FIG. 5, the disperser 31 comprises a motor-driven disc 32 having a serrated edge, rotatable inside a casing 33, the clearance between the serrated edge and the casing being such as to give the required suspended particle size. The disc, as shown, is in the form of a rotor having a multiplicity of parallel slots in close running relation to the casing. Liquid is supplied to the disperser through the inlet nozzle 33' and is discharged through the outlet nozzle 34.

We claim:

1. A method for detecting minor amounts of solid material suspended in a liquid which may also have suspended in it a minor amount of another liquid whose solubility increases with increasing temperature, comprising heating a sample of the liquid to be tested to dissolve completely the suspended liquid in the other liquid, splitting the heated sample into two streams, removing solid material from one stream, passing a beam of light through each stream and comparing the light absorption of each stream.

2. A method as claimed in claim 1 wherein the liquid to be tested is an aviation kerosine containing water in an amount of up to 500 p.p.m.

3. A method as claimed in claim 1 wherein the liquid to be tested is treated to remove any vapour and air bubbles prior to the comparison of light absorption.

4. A method as claimed in claim 3 wherein the liquid to be tested is treated for the removal of air and vapour bubbles before it is split into two streams but after heating.

5. A method as claimed in claim 1 wherein any suspended liquid is dispersed prior to heating.

6. An apparatus for detecting minor amounts of solid material suspended in a liquid which may also have suspended in it a minor amount of another liquid whose solubility increases with increasing temperature comprising a sample line for the flow of a sample of the liquid to be tested which sample line is split into two branches, heating means in said sample line for heating said sample of the liquid to be tested to dissolve completely any suspended liquid in said sample prior to a subsequent light absorption, means in one of said branches for removing solid material from heated sample liquid flowing in said one branch, a light absorption cell in each branch with a photo-electric cell attached to each light absorption cell, a source of light for said light absorption cells, and means for comparing the light absorption of the streams of heated sample liquid free of suspended liquid in each light absorption cell.

7. An apparatus as claimed in claim 6 wherein the means for heating is situated in the sample line before said branches.

8. An apparatus as claimed in claim 7 which includes an air/vapour separator situated in the line before said branches but after the heating means.

9. An apparatus as claimed in claim 6 which includes means for cooling the photo-electric cells, said means comprising jackets surrounding the photo-electric cells and a line leading from a point in the sample line prior to the heating means and passing through the jackets surrounding the photo-electric cells.

10. An apparatus as claimed in claim 9 wherein the line leading from the point in the sample line prior to the heating means splits into two branches, one branch passing through a jacket surrounding one of the photo-electric cells, the other branch passing through the other jacket surrounding the other photo-electric cell.

11. An apparatus as claimed in claim 6 which includes a disperser situated prior to the heating means.

12. An apparatus as claimed in claim 11 wherein the disperser comprises a disc having a serrated edge rotatable inside a casing, the clearance between the serrated edge and the casing being adjusted to give the required suspended liquid particle size.

13. An apparatus as claimed in claim 6 wherein the means for comparing the light absorption in the light absorption cells comprises an electrical bridge circuit which includes an alarm system which operates should the presence of solid material be detected.

References Cited in the file of this patent
UNITED STATES PATENTS

| | | |
|---|---|---|
| 2,078,065 | De Bethune | Apr. 20, 1937 |
| 2,362,278 | Jones | Nov. 7, 1944 |
| 2,519,081 | Skarstrom | Aug. 15, 1950 |
| 2,756,626 | Lansing et al. | July 31, 1956 |
| 2,819,608 | McLaren et al. | Jan. 14, 1958 |
| 2,859,757 | Parsons | Nov. 11, 1958 |
| 2,962,926 | Marak et al. | Dec. 6, 1960 |
| 2,979,385 | Karasek et al. | Apr. 11, 1961 |